United States Patent
Lee et al.

(10) Patent No.: US 11,449,738 B2
(45) Date of Patent: Sep. 20, 2022

(54) NEUROMORPHIC MEMORY MANAGEMENT SYSTEM AND METHOD THEREOF

(71) Applicant: Korea Electronics Technology Institute, Seongnam-si (KR)

(72) Inventors: Sang Yub Lee, Seongnam-si (KR); Jae Jin Ko, Gwangju-si (KR); In Pyo Cho, Suwon-si (KR); Jae Kyu Lee, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 571 days.

(21) Appl. No.: 16/537,293

(22) Filed: Aug. 9, 2019

(65) Prior Publication Data

US 2021/0042615 A1 Feb. 11, 2021

(30) Foreign Application Priority Data

Aug. 9, 2019 (KR) .................. 10-2019-0097667
Aug. 9, 2019 (KR) .................. 10-2019-0097668
Aug. 9, 2019 (KR) .................. 10-2019-0097669

(51) Int. Cl.
  *G06N 3/063* (2006.01)
  *G06F 12/02* (2006.01)

(52) U.S. Cl.
  CPC ......... *G06N 3/063* (2013.01); *G06F 12/0207* (2013.01); *G06F 12/0238* (2013.01)

(58) Field of Classification Search
  None
  See application file for complete search history.

(56) References Cited

U.S. PATENT DOCUMENTS

2015/0312124 A1* 10/2015 Curtin .................. G06F 3/0638
  709/224
2018/0349035 A1* 12/2018 Ellis ........................ G06F 3/061

FOREIGN PATENT DOCUMENTS

| JP | 2017-033306 A | 2/2017 |
| KR | 10-2012-0102664 A | 9/2012 |
| KR | 10-2017-0023695 A | 3/2017 |
| KR | 10-2018-0024660 A | 3/2018 |
| KR | 10-2018-0102659 A | 9/2018 |
| KR | 10-2018-0131466 A | 12/2018 |
| KR | 10-2019-0085781 A | 7/2019 |

OTHER PUBLICATIONS

Office Action in Korean Application No. 10-2019-0097669 dated Oct. 22, 2021 in 5 pages.
Office Action dated Apr. 21, 2022 in Korean Application No. 10-2019-0097667.
Notice of Allowance dated May 20, 2022 in Korean Application No. 10-2019-0097667.

* cited by examiner

*Primary Examiner* — Charles J Choi
(74) *Attorney, Agent, or Firm* — Knobbe Martens Olson & Bear LLP

(57) ABSTRACT

Provided are a system and method for managing a neuromorphic memory. The system includes a memory having a multi-dimensional lattice structure, a prescience estimator (PSE) configured to separately estimate memory use of two or more data sets and determine a sequence of inputting the two or more data sets to the memory, and a prescience manager (PSM) configured to allocate memory regions in which the two or more data sets will be stored according to estimation results of the PSE, store the data sets, and perform learning and inference.

22 Claims, 9 Drawing Sheets

NEUROMORPHIC MEMORY MANAGEMENT SYSTEM AND METHOD THEREOF

CROSS-REFERENCE TO RELATED APPLICATION

This application claims priority to and the benefit of Korean Patent Applications Nos. 10-2019-0097667, 10-2019-0097668 and 10-2009-0097669, filed on Aug. 9, 2019, the disclosure of each of which is incorporated herein by reference in its entirety.

BACKGROUND

1. Field of the Invention

The present invention relates to a memory management and data operation method and more particularly, to a system and method for managing a neuromorphic memory and calculating data in a low-power device or a device which operates independently.

2. Discussion of Related Art

Synapses of a neuromorphic device are configured in an array structure, and various memory units are used to implement a learning function and calculate data.

A neuromorphic memory for this purpose generally stores data of 128 bytes per neuron. An existing memory allocation method is a daisy chain method in which data is sequentially stored and processed from the first position of a memory. For example, learning and inference from input data A of 640 bytes require 5 neurons, neuron No. 0 to neuron No. 4, as shown in FIG. 1.

An existing neuromorphic memory receives and processes one piece of input data at a time. Therefore, when it is necessary to continuously process another input data B (640 bytes), the whole memory (neurons) should be reset, and then the input data B is input to neuron No. 0 to neuron No. 4 which have been used for the input data A.

All leaning content for the application data A is stored in an external memory unit for subsequent recognition (inference). Due to this process, there is a great difference in data processing performance between neuromorphic memories according to the types, processing rates, and access rates of external memory units.

To obtain a favorable processing rate, a high system bus rate is required, and rapid data exchange is required between an external memory unit and a system core. A low-power device or low-end device exhibits a considerably low data rate, and a data bottleneck may occur accordingly. Therefore, it is difficult to apply an external memory to the low-power device or low-end device.

Further, power consumption or performance may actually be dependent on an external memory unit rather than a neuromorphic chip.

Such a problem occurs not only in a learning process but also in a process of loading learning results from an external memory to recognize input data or infer from input data.

Also, when only small area of memories is used due to a small size of input data, there is inefficiency in view of memory use.

On the other hand, a recursive operation is not applied to an existing neuromorphic chip due to characteristics of the neuromorphic chip. Therefore, it is not possible to apply an algorithm used for deep learning or an algorithm which requires recursive operation in machine learning to an existing neuromorphic semiconductor.

SUMMARY OF THE INVENTION

The present invention is directed to departing from an existing neuromorphic memory allocation method which is a uniform daisy chain method and providing a memory management system and method for variably changing a memory structure in a neuromorphic semiconductor.

The present invention is also directed to providing a memory management system and method for performing memory allocation on the basis of an estimation of memory use and increasing efficiency in memory use by allocating a memory region, which is not currently used, for use.

In particular, when an estimated memory size is inaccurate or memory allocation is not appropriately performed, a space utilization function which may be re-adjusted through feedback is adapted.

The present invention is also directed to providing a new operation method of a neuromorphic chip to which an algorithm applied to deep learning and a recursive operation algorithm may be applied, by using of neuromorphic memory management system.

Objects of the present invention are not limited to the aforementioned objects, and other objects which have not been mentioned may be present.

According to the present invention, a memory structure in a neuromorphic chip is changed. A prescience estimator (PSE) manager estimates the memory use of a corresponding application, and a prescience manager (PSM) allocates each part of a neuromorphic memory structure such that the aforementioned objects are achieved.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described below in detail with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims.

Meanwhile, terms used herein are for the purpose of describing embodiments only and are not intended to limit the present invention. As used herein, the singular forms are intended to include the plural forms as well unless the context clearly indicates otherwise. The terms "comprises" and/or "comprising" used herein indicate the presence of stated elements, steps, operations, and/or devices and do not preclude the presence or addition of one or more other elements, steps, operations, and/or devices.

Unless otherwise defined, all terms (including technical and scientific terms) used herein have the same meaning as commonly understood by those of ordinary skill in the technical field to which the present invention pertains.

Meanwhile, when an embodiment may be implemented in a different way, a function or operation specified in a specific block may be performed differently from the flow specified in a flowchart. For example, two consecutive blocks may actually be performed at substantially the same time or may be performed in reverse order according to the relevant function or operation.

Figure 1:
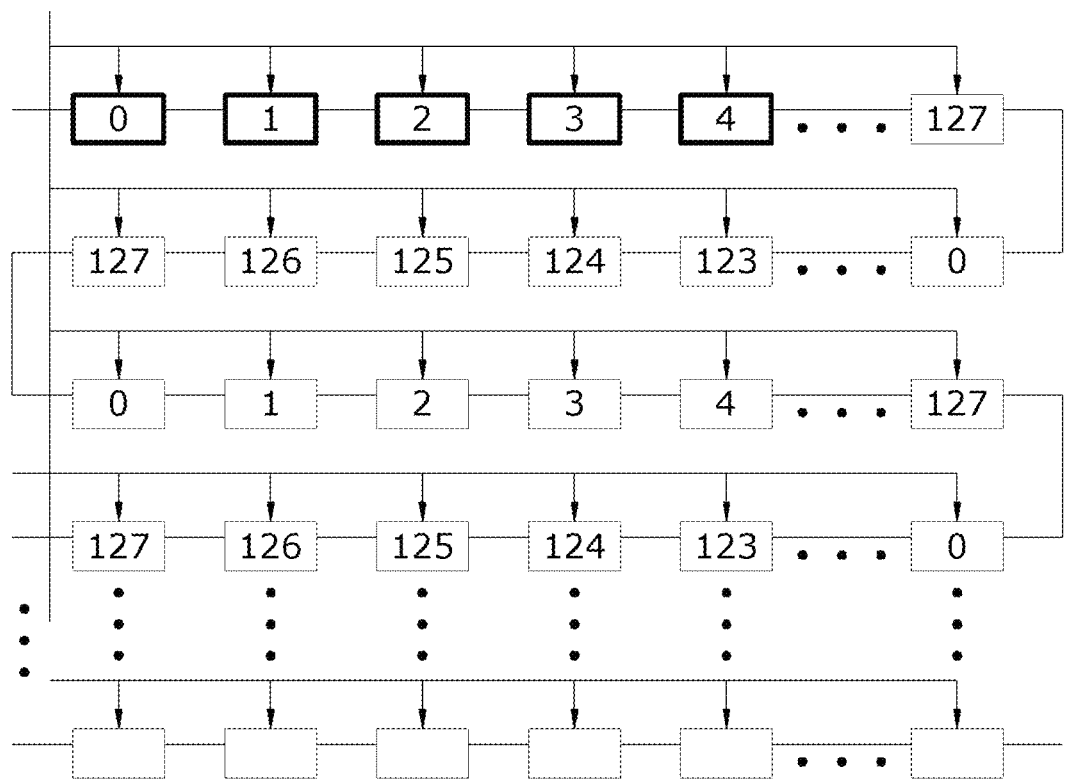
FIG. 1 is a diagram illustrating a structure of an existing neuromorphic memory and a method of storing input data in the neuromorphic memory.
Figure 2:
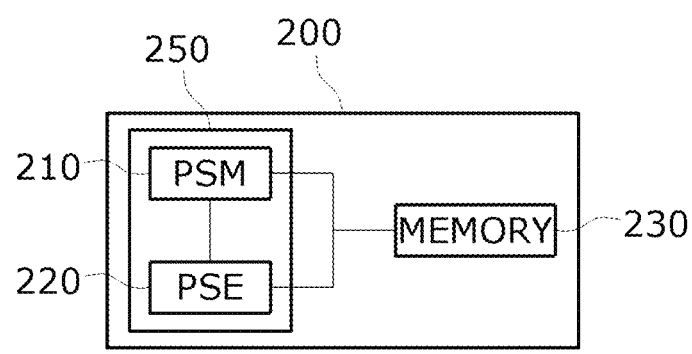
FIG. 2 is a block diagram of a variable memory management system according to an exemplary embodiment of the present invention.

As shown in FIG. 2, a neuromorphic memory management system 200 according to an exemplary embodiment of the present invention includes a prescience estimator (PSE) 220 for estimating memory use of each application which will use a memory 230, and a prescience manager (PSM) 210 for allocating a part or all of a whole neuromorphic memory on the basis of the estimated memory use.

The PSE 220 and the PSM 210 may be implemented as a software module or a hardware module in the system core 250 of a neuromorphic chip or implemented as a hardware module separate from the system core 250.

The memory 230 according to an exemplary embodiment of the present invention has a multi-dimensional lattice structure and has a variable memory structure which allows memory access in various directions according to dimensions. For example, when the memory 230 has a two-dimensional (2D) lattice structure, memory access is allowed in up, down, left, and right directions, that is, four directions, and when the memory 230 has a three-dimensional (3D) lattice structure, memory access is allowed in both directions on each of x, y, and z axes (six directions in total), shown in FIG. 4.

The variable memory structure may be implemented by configuring an existing neuromorphic memory to logically have a multi-dimensional structure. Otherwise, two or more neuromorphic memories may be stacked in a 3D structure or manufactured in a 3D structure according to a semiconductor processing method.

Figure 5:
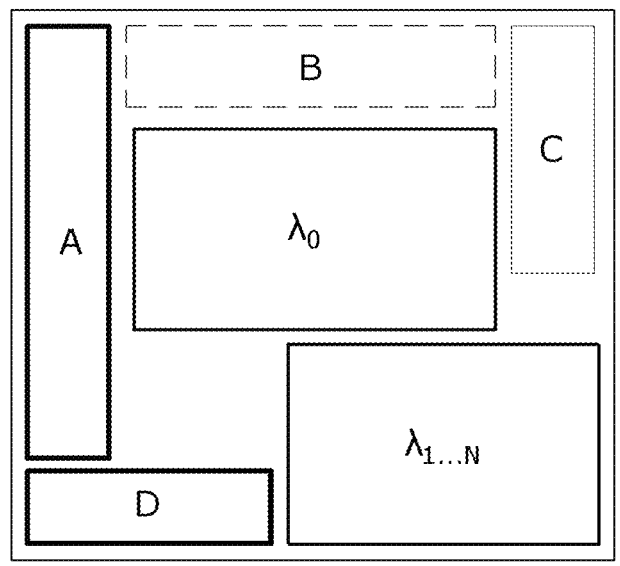
FIG. 5 is a diagram showing a basic memory allocation method according to an exemplary embodiment of the present invention.
Figure 6:
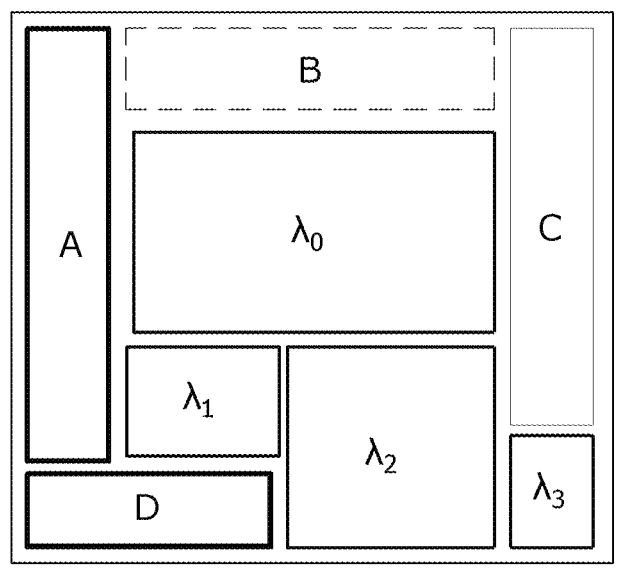
FIG. 6 is a diagram showing an optimal memory allocation method according to an exemplary embodiment of the present invention.

Unlike the one-dimensional store scheme (e.g. the daisy chain method) of an existing neuromorphic semiconductor, memory allocation is configured in a 2D plane structure or a 3D structure (a single lattice or multi-lattice structure) as shown in FIG. 5 or 6.

Figure 3:
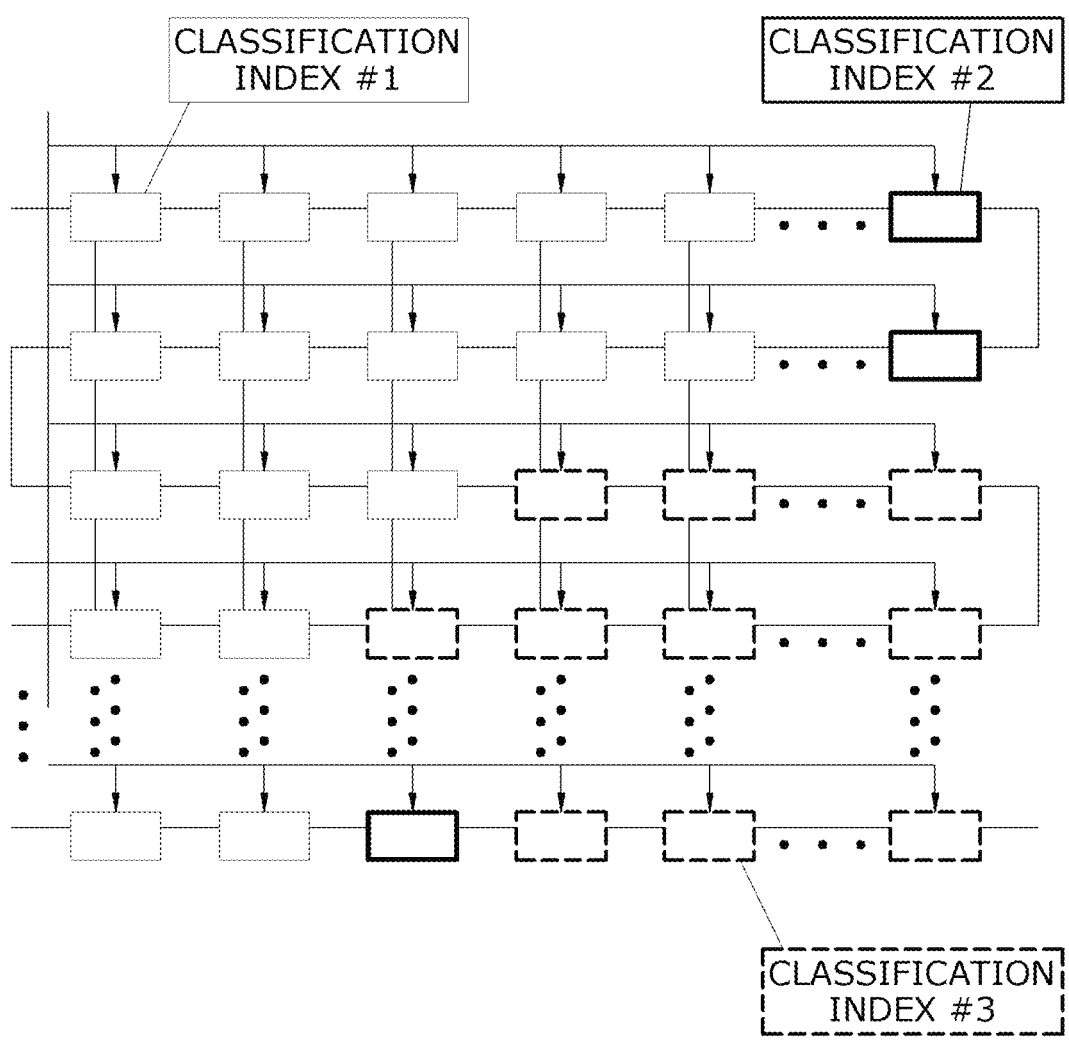
FIG. 3 is a diagram illustrating a method of allocating two or more pieces of data to a variable memory according to an exemplary embodiment of the present invention.

Consequently, as shown in FIG. 3, several kinds of data may be simultaneously stored in a neuromorphic memory, and several kinds of data may be simultaneously processed.

Figure 4:
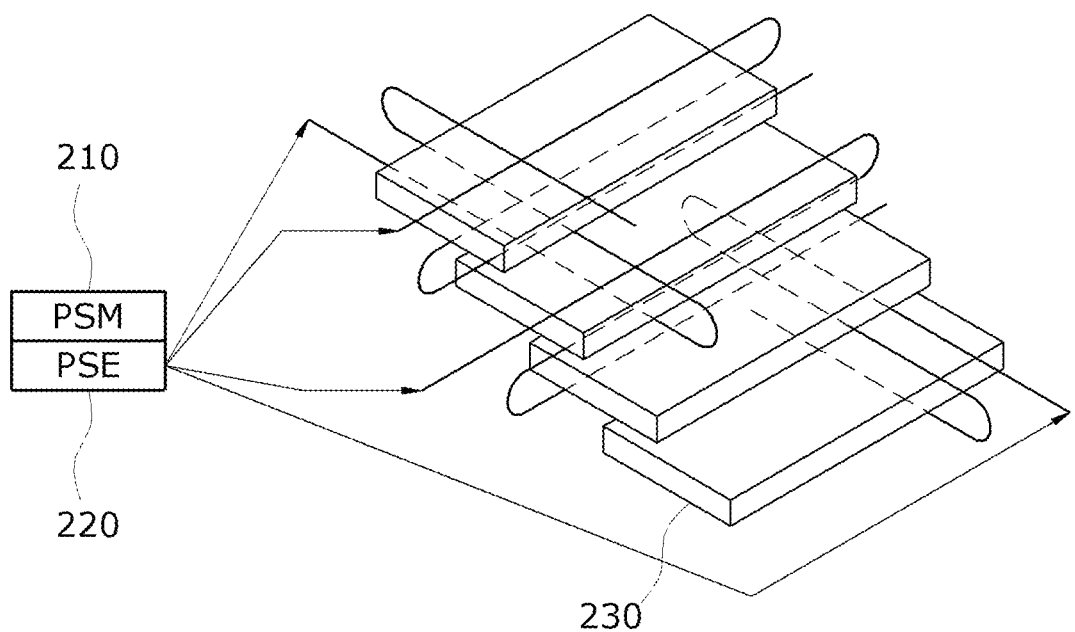
FIG. 4 is a schematic diagram illustrating operation of a variable memory management system according to an exemplary embodiment of the present invention.

FIG. 4 schematically shows efficient use and effects of such a variable memory structure. As shown in the drawing, writing and reading may be performed in a variable multi-dimensional memory in horizontal, vertical, and height directions under the control and management of the PSM 210 and the PSE 220.

The following advantages may be obtained by adopting such a memory structure.

It is possible to increase efficiency in using the memory space of a neuromorphic semiconductor chip.

Since reference data which corresponds to results of learning and input data may be stored in one memory due to a variable-allocation memory having a lattice structure, it is possible to prevent performance degradation caused by accessing an external memory unit.

When input data is stored in a variable memory structure having a lattice structure and learned at an interval of time, it is possible to use a weighting method which allows recursive operation. Therefore, it is possible to use an algorithm for achieving various deep learning algorithm effects rather than a simple algorithm employing a single layer. Also, It is possible to imitate deep learning algorithm employing multiple hidden layers by multiplexing data allocation spaces of memory.

In this way, each piece of data is learned in each memory region allocated by the PSM 210 and the PSE 220, and information fusion of various pieces of data is occurred at once. Therefore, a kind of machine learning is possible even with a small memory size in a neuromorphic chip, and rapid memory access is possible with low power. Results of learning are separately stored and used later for recognition (inference).

In a recognition operation, the PSM 210 knows a data state of a learned region. Therefore, when several kinds of input data are input for recognition, the PSM 210 performs the overall procedure required for a comparison operation of corresponding data so that comparison may be performed.

A memory allocation method performed by the PSM 210 and PSE 220 together according to the present invention will be described in detail with the following embodiments.

First Embodiment

Basically, a memory is allocated in decreasing order of the size of input data sets.

First, the PSE 220 detects an available memory space. An available memory space may be detected immediately before a data input is required. Or an available memory space may be detected constantly for the stability of a load.

Subsequently, the PSE 220 estimates the sizes of input data sets. For example, the PSE 220 estimates how much each of a plurality of pieces of data which require fusion to make one decision (e.g., four categories of sensing data, temperature, humidity, dust, and $CO_2$, for fire detection) will be input in a certain period of time.

The estimation may be made on the basis of a previously accumulated application-specific data type and size table (e.g., in the case of an indoor fire detection application, basic information indicating that five kinds of gas concentration data are sampled once per second, how many times each kind of gas concentration data is sampled per second, or the like is stored) according to the type of application currently executed, or the estimation may be made by receiving the type and size of input data according to an executed application.

Otherwise, the type and size of input data may be estimated on the basis of (to be the same as) the type and size of data which has been inputted before. An estimation method is not limited to the above examples and encompasses various methods which are possible within the technical spirit of the present invention.

When the PSE 220 estimates the size of each input data set, the PSM 210 allocates a memory region in which the input data set will be stored according to the estimated size of the input data set. Allocation of a memory region and storing in the memory region may be performed in order of the size of input data sets.

Assuming that the PSE 220 estimates that 200 pieces of temperature data, 100 pieces of humidity data, 20 pieces of $CO_2$ data, and 50 pieces of dust data will be input, the PSM 210 allocates a memory region to the temperature data set which has the largest size first and stores the temperature data set in the memory region. Then, the PSM 210 sequentially allocates other memory regions to the humidity, dust, and $CO_2$ data sets and sequentially stores the data sets in the memory regions.

Second Embodiment of Memory Allocation: Allocation in Consideration of Utilization Threshold (UT)

Since there is no reference to a memory allocation region for each piece of input data, when memory allocation is performed as described in the first embodiment, data may be sequentially stored in respective regions of a memory cell like in the daisy chain method, or different kinds of data may be distributed all over a memory cell. In this case, memory management for storing and using processing results of learning or inference in the same memory may be complicated.

Therefore, in the second exemplary embodiment, sections are determined according to the kinds of input data for memory allocation. First, a memory region is temporarily allocated to each input data set, and then efficiency is evaluated to reallocate memory regions so that efficiency may be increased. Detailed examples are described below.

The PSE 220 detects an available memory space and estimates or detects size of 0 to L of input data values and the number of samples of each input data value.

Subsequently, estimated information is compared with a neuro-cell memory size of 0 to B to calculate a UT (Utilization Threshold) value. As for memory allocation, the PSM 210 determines how to allocate each data set on the basis of a UT value calculated for each data set.

For example, a space N of a neuromorphic memory is obtained according to a total number M (M<N) of input data sets. A memory size of B required by each input data set is compared with the number H of cells corresponding to a column or a row (any one side of a memory region temporarily set for each piece of input data) available for the input data set in the neuromorphic memory to determine a UT value (=B/H). Then, the memory is allocated to data sets in decreasing order of UT value.

Any one side of a memory region whose number H of cells will be calculated may be previously determined to be any one of rows and columns (in the case of a 3D memory, rows, columns, and vertical sides), randomly determined, or determined to be a side in which a smaller number of cells are present or a side in which larger number of cells are present. The same reference may be used for all input data sets regardless of determined side.

An example will be described below in detail.

It is assumed that data sets which require fusion to make one decision, for example, four categories of temperature, humidity, dust, and $CO_2$ for fire detection, are monitored and 200 samples of temperature data, 100 samples of humidity data, 20 samples of $CO_2$ data, and 50 samples of dust data are input as sensing data within the same period of time.

To use a memory most efficiently in this situation, the PSE 220 calculates a UT value of each input data set.

In this embodiment, the temperature, humidity, $CO_2$, and dust data have UT values of 200/H1, 100/H2, 20/H3, and 50/H4, respectively. An available memory region is first allocated to the temperature data set which has the largest UT value, and then remaining available memory regions are allocated to the humidity, dust, and $CO_2$ data sets in sequence (each of H1, H2, H3, and H4 is the number of memory cells corresponding to a column or a row of the available memory region for each of the four input data sets).

When H1=H2=H3=H4 in this embodiment, the memory is allocated in decreasing order of the number of pieces of sample data, and this is the same as in the first embodiment.

However, the H values of the data sets may vary as follows and may also be used with UT values to set a memory region.

Since the memory management system 200 according to the invention has a variable structure, the positions and the number of columns or rows in a memory region to which each piece of input data may be allocated may vary.

Therefore the following is assumed.

The PSE 220 temporarily sets H1 to 20 for the 200 samples of temperature data and sets H2, H3, and H4 to 10, 5, and 60 for the 100 samples of humidity data, the 20 pieces of $CO_2$ data, and the 50 pieces of dust data, respectively. The H values may be set by considering the distribution of currently available memory regions.

When the H values are set as described above, UT values (=B/H) of the input data sets are 200/20 (temperature data set), 100/10 (humidity data set), 20/5 ($CO_2$ data set), and 50/60 (dust data set).

In other words, the UT values of the input data sets are 10 (temperature data set), 10 (humidity data set), 4 ($CO_2$ data set), and 0.83 (dust data set).

In the second embodiment, the PSM 210 allocates a memory to the temperature, humidity, $CO_2$, and dust data sets in sequence on the basis of the UT values. The temperature data set and the humidity data set have the same UT value. In this case, a data set having a larger number of pieces of sample data may have priority.

On the basis of the UT values, it is possible to estimate the shape of a memory region, the degree of aggregation of homogeneous data in a memory, or memory efficiency.

When a value of H/UT is two (in the case of the temperature data), the corresponding data will be stored in a memory region whose width-to-length ratio is 1:2, and when a value of H/UT is one (in the case of the humidity data), the corresponding data will be stored in a square memory region. In other words, the closer the value is to one, the higher the degree of aggregation.

Meanwhile, when a UT value is less than one, the amount of input data is less than the number of memory cells corresponding to one row or column, and thus it is possible to estimate that a memory cell is wasted.

Therefore, H may be set so that the H/UT value of each input data may be as close to one as possible. The H/UT value may not exceed ten and may more preferably be in the range of one to five.

The memory management system 200 of the present invention may reallocate a memory on the basis of the H/UT values, calculate H/UT values again according to resultant data-specific memory regions and H values, and finally set memory regions by repeating the above-described process until H/UT values gets close to the range of one to five. Alternatively, the memory management system 200 may allocate memory regions by repeating H/UT calculation in a reallocation process so that each allocated memory region may have an H/UT value of ten or less.

When a memory region in which each data set will be stored is determined, data is stored in each memory region in order of the size of UTs or input data sets.

In this way, it is possible to achieve optimal efficiency in memory use.

Third Embodiment of Memory Allocation: Based on Lambda Element Technique

The third embodiment of memory allocation according to the present invention will be described with reference to FIGS. 5 and 6. The third embodiment corresponds to a method of setting each memory region on the basis of a remaining available region in a memory. First, four sides of a memory are allocated to four input data sets in decreasing order of the size of input data sets, and then other memory regions are allocated using a gamma element technique. In the case of a 3D memory, six sides of the memory are allocated first to six input data sets in decreasing order of the size of input data sets, and then other memory regions are allocated. For convenience of description and easy understanding, an example of allocating other regions of a 2D lattice memory will be described below. However, the following description may be applied to a high-dimensional (3D or higher dimensional) memory as well. A detailed method is as follows.

1) To check a single memory size, a neuron size and the number of neurons $(n_x, n_y)$ according to an x-axis and a y-axis, that is, the number of memory cells in each side of a memory region, are checked.

At this time, $n_x \cong n_y$ may be satisfied if possible. In other words, each memory region may be close to a square.

2) As shown in FIG. 5, four sides of the memory are filled as much as possible with pieces of input data A, B, C, and D in input order.

3) Subsequently, to use as much of the remaining center part as possible without overlap, the remaining center part is allocated using the λ element technique according to equations $|A-B|=\lambda_0$ and $|A-D|=\lambda_1$, and corresponding areas are sequentially set according to equations, such as $|\lambda_0-\lambda_2|=\lambda_1$ and $|C-\lambda_2|=\lambda_3$.

4) Data is allocated to the determined regions in order of data size.

4-1) The initial four pieces of data A, B, C, and D filling the four sides are allocated in order of data size.

4-2) Then, regions $\lambda_0, \lambda_1, \lambda_2$, and $\lambda_3$ are filled with input data in order of the size of input data.

FIG. 6 is a diagram exemplifying an optimal data input method according to the third embodiment of the present invention. In the case of FIG. 6, four sides are filled with data in order of A, B, C, and D, that is, in decreasing order of size, and then pieces of input data having the subsequent sizes are sequentially stored in $\lambda_0, \lambda_2, \lambda_1$, and $\lambda_3$.

To this end, the PSM 210 and the PSE 220 know or estimate the size of each piece of input data.

In this embodiment, when the size of any data set is greater than a sequentially allocated memory region during memory allocation, the data set is divided, and a part of the data set is stored in the allocated memory region. The remaining part of the data set is stored in the smallest memory region among other memory regions which are larger than the size of the remaining part of the data set. When the size of a data set is larger than the sum of two memory regions, the data set is stored in three or more memory regions in the same manner as described above.

When one data set is stored in one or more memory regions, the PSM 210 keeps detecting and managing in which of one or more memory regions the data set is stored.

In brief, memory allocation and storage are performed in order of the size of input data, and a memory region of each piece of input data is configured as close to a square as possible. Also, regions are configured to aggregate the same kind of input data and allocated. In other words, memory regions are configured so that a remaining region which has not been allocated may be as large an aggregation area as possible.

In other words, a memory region having the largest available area is allocated to large-size input data first. In this way, an unused memory space is minimized.

Also, the PSE 220 provides a software region so that rules required by a user may be defined. In other words, a region is provided in which a user may define which combination of a plurality of inputs satisfies which condition, and when a condition is satisfied, the PSM 210 determines how to allocate corresponding data to which memory.

The PSM 210 stores input data in a memory on the basis of estimation results of the PSE 220. The PSM 210 obtains optimal memory regions for use by alternately storing input data in a horizontal array of memory cells and a vertical array of memory cells in a 2D memory. In the case of a 3D memory, input data is stored along horizontal, vertical, and height arrays (i.e., 3 axes of x, y, and z) by turns.

As described above, each piece of data is learned according to a memory region obtained through the PSM 210 and PSE 220, and information fusion of various pieces of data is learned at once. Therefore, learning is possible even with a memory which is as small as a memory size in a neuromorphic semiconductor chip, and rapid memory access is possible with low power.

Results of learning are separately stored and used later for learning recognition.

In a recognition (inference) operation, the PSM 210 knows a data state of a learned region. Therefore, when several kinds of input data are input for recognition, the PSM 210 performs the overall procedure required for a comparison operation of corresponding data so that comparison may be performed.

As described above, when a memory space is used, the memory management system 200 according to the invention uses the PSM 210 and PSE 220 to estimate memory use of a corresponding application and allocate or reallocate an unused region in a neuromorphic memory structure so that the unused region may be used as much as possible, thereby increasing memory efficiency.

Unlike the existing method employing an external memory unit, the memory management system 200 may perform data storing for learning or comparison operation for inference using several data sets at once. Therefore, it is possible to prevent performance degradation caused by accessing an external memory unit.

Meanwhile, when input data is stored and learned at an interval of time using a variable memory structure of the present invention, it is possible to use a weighting method which allows recursive operation. Therefore, it is possible to use various deep learning algorithms and an algorithm employing multiple layers rather than a simple algorithm employing a single layer.

Figure 7:
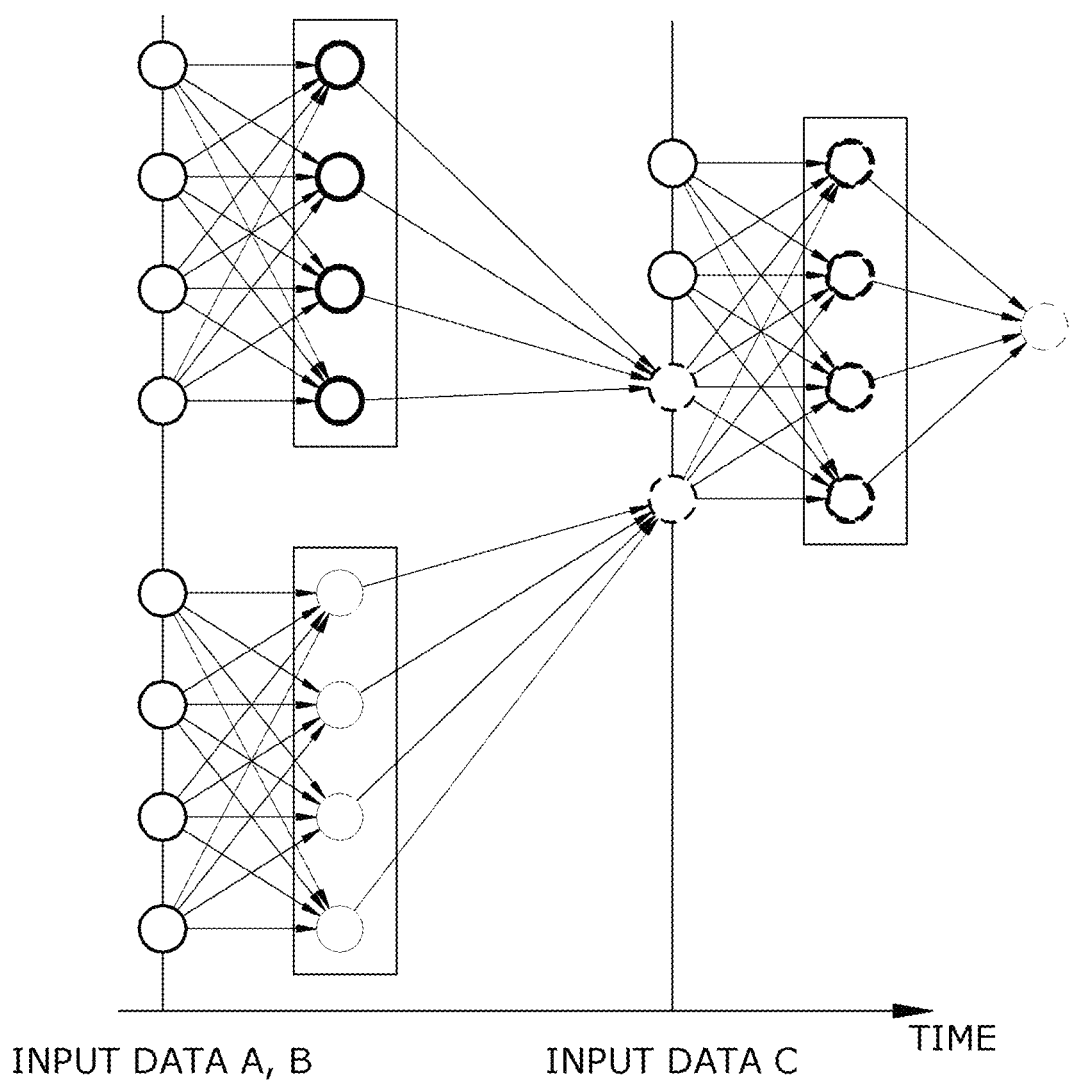
FIG. 7 is a conceptual diagram of a multi-data operation method according to an exemplary embodiment of the present invention.

According to a data operation method that may be performed by a neuromorphic memory management system of the present invention, two or more pieces of data A, B, and C are stored in different memory regions as shown in FIG. 7. When such a variable structure is used, recursive operation effects may be obtained. This method may also be used to monitor a change in a single piece of data over time and compare the data before the change with the data after the change as shown in FIG. 8.

Figure 8:
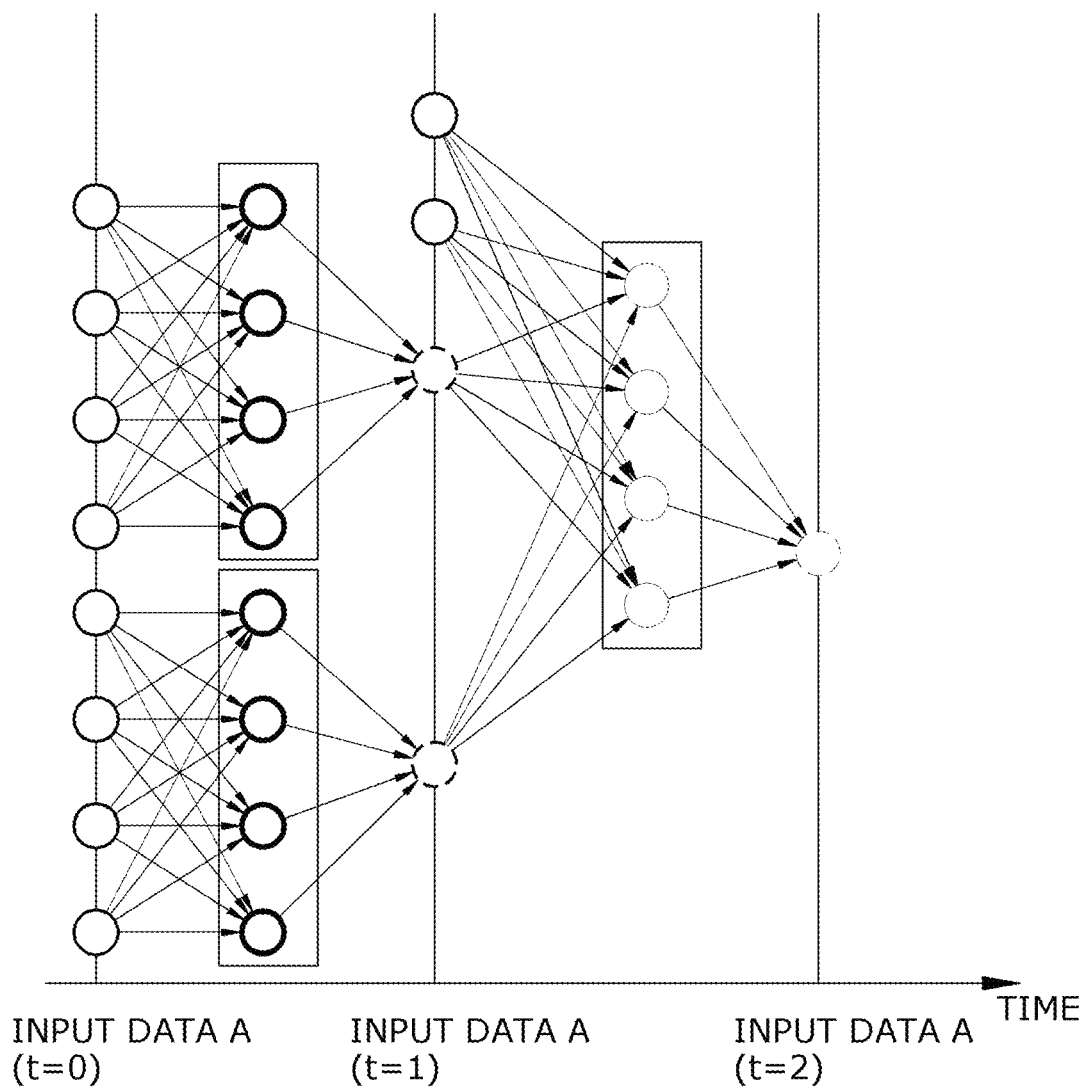
FIG. 8 is a conceptual diagram of an operation method for data which is input at different times according to an exemplary embodiment of the present invention.
Figure 9:
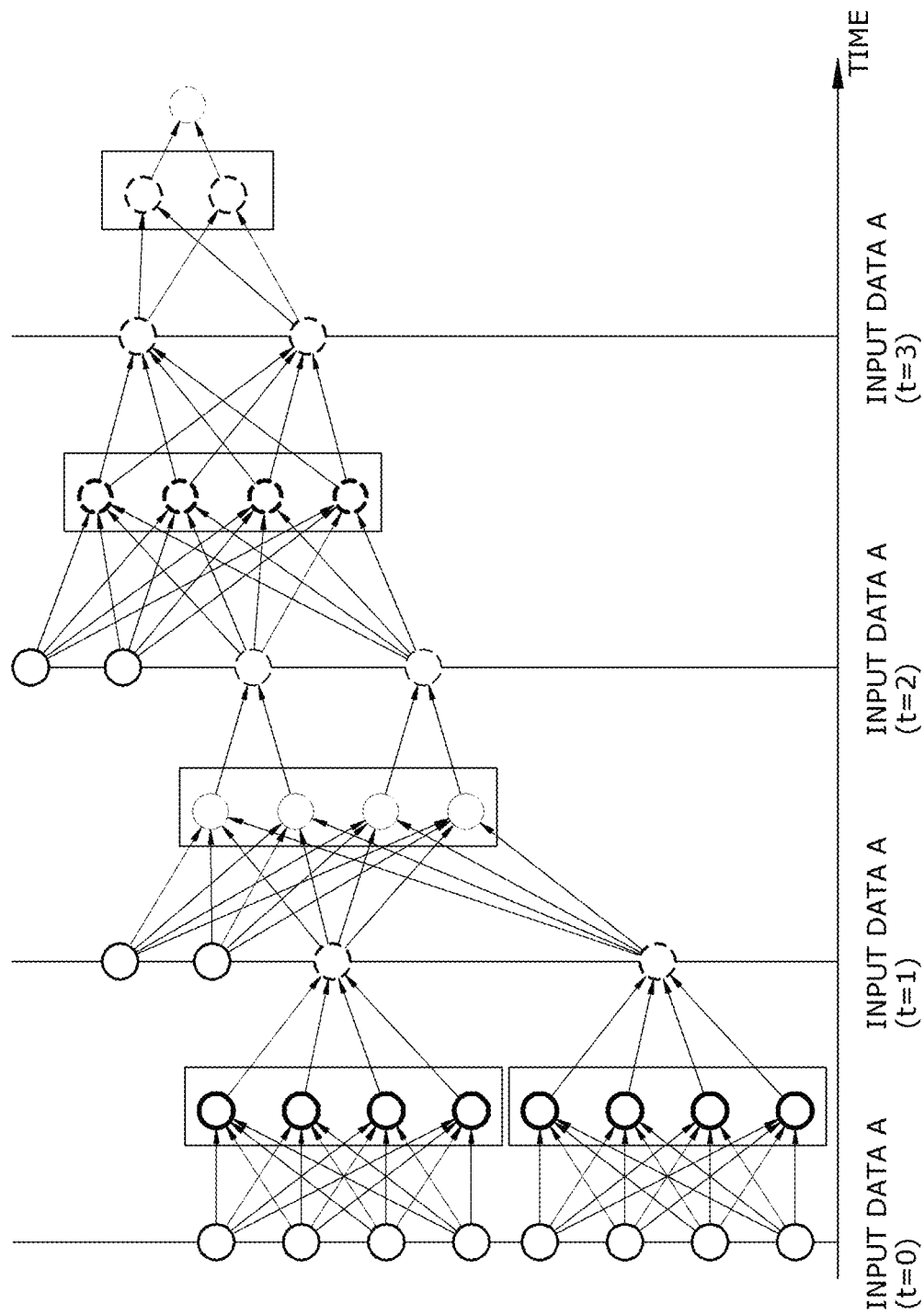
FIG. 9 is a conceptual diagram of a complex operation method according to an exemplary embodiment of the present invention.

Also, the embodiments shown in FIGS. 7 and 8 may be combined and used to monitor a change in a plurality of pieces of data over time and compare the pieces of data before the change with the pieces of data after the change. FIG. 9 illustrates such a case of monitoring a change in a plurality of pieces of data over time, and various comparison operation algorithms may be applied to the case.

Operation methods will be described in further detail below with reference to some embodiments, but operation methods of the present invention are not limited thereto.

First Embodiment of Operation Method

For example, when a service for preventing drowsy driving of a driver is implemented, as shown in FIG. 7, a heartbeat rate and an eye blinking rate among biometric information of a driver are received as data A and B and learned, and then comparison operation is performed in an inference stage. It is possible to improve accuracy by performing comparative learning and comparison operation between results of the comparison operation and travel time-specific data (data C). In other words, whether the driver is drowsy is not simply determined with only a heartbeat rate and/or an eye blinking rate of a certain value or more but is determined by further considering a travel time in the comparison results of a heartbeat rate and/or an eye blinking rate.

Heartbeats and eye blinking in a normal state and a drowsy state vary according to travel time.

Therefore, a plurality of heartbeat rates and eye blinking rates (data A and B) within a range which may be considered the drowsy state are learned in advance, and also heartbeat rates and eye blinking rates (data C) which may be considered the drowsy state according to travel time are learned in advance. Subsequently, when a heartbeat rate and an eye blinking rate are not within the drowsiness range, comparison operation with the data C is not performed. On the other hand, when the heartbeat rate and the eye blinking rate are within the drowsiness range, a comparison operation of the data C is performed to determine whether the heartbeat rate and the eye blinking rate may be considered the drowsy state according to travel time, and it is finally determined whether the driver is drowsy.

Alternatively, when there is a correlation between the data A and the data B or it is possible to make a decision on one of the data A and the data B first, one of the data A and the data B may be compared with the drowsiness range first. When the data is determined to be within the drowsiness range, the other data may be subsequently compared with the drowsiness range. When the other data is also within the drowsiness range, the data C may be compared with the drowsiness range. In this way, a comparison operation may be sequentially performed on each piece of data to make a decision.

The data A, B, and C may be learned according to each driver. However, when it is difficult or inconvenient to learn data according to each driver, reference data (training values) of several drivers may be stored, and then it may be determined whether corresponding input data is within a range of the stored reference data or satisfies each condition of the stored reference data.

Second Embodiment of Operation Method

As shown in FIG. 8, a situation awareness operation may be performed according to a change in input data over time. For example, when a certain pattern of data over time is required to determine a current situation, data may be stored according to time, and then it is possible to determine whether corresponding data changes according the certain pattern.

In particular, determining an operation sequence according to a comparison sequence of data may have the same effect as if a weight was given to each input data set.

Figure 10:
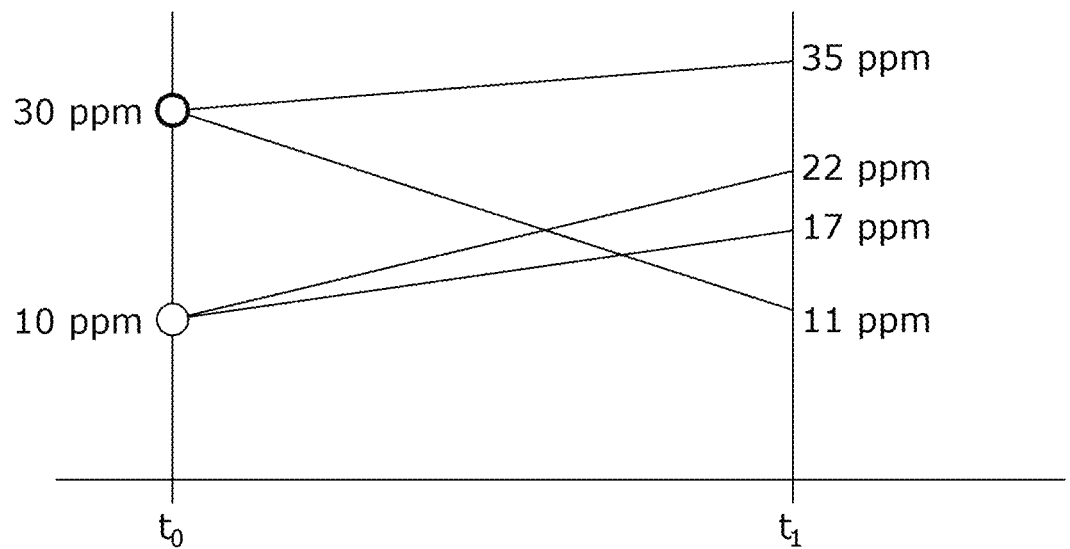
FIG. 10 is a diagram illustrating effects of giving weights to pieces of input data inputted at different times according to an exemplary embodiment of the present invention.

As shown in FIG. 10, an input data set A on an "a" gas concentration input at a time t=0 is compared with results of previous learning (reference data), and a gas concentration is detected on the basis of similarity. For example, if an "a" gas concentration is detected to be 30 ppm, a warning of danger may be issued when the concentration value input at the next measurement time t=1 is 11 ppm to 35 ppm. If the gas concentration is detected to be, for example, 10 ppm, a warning of danger may be issued only when the gas concentration measured at the next measurement time t=1 is 17 ppm to 22 ppm. This relationship between the time t=0 and the time t=1 may be set for a time t=2 as well, and multiple layers may be configured by setting the same relationship for times t>2.

This setting has the same effect as if a weight of the "a" gas concentration at the time t=0 was larger than a weight of the "a" gas concentration at the time t=1.

Figure 11:
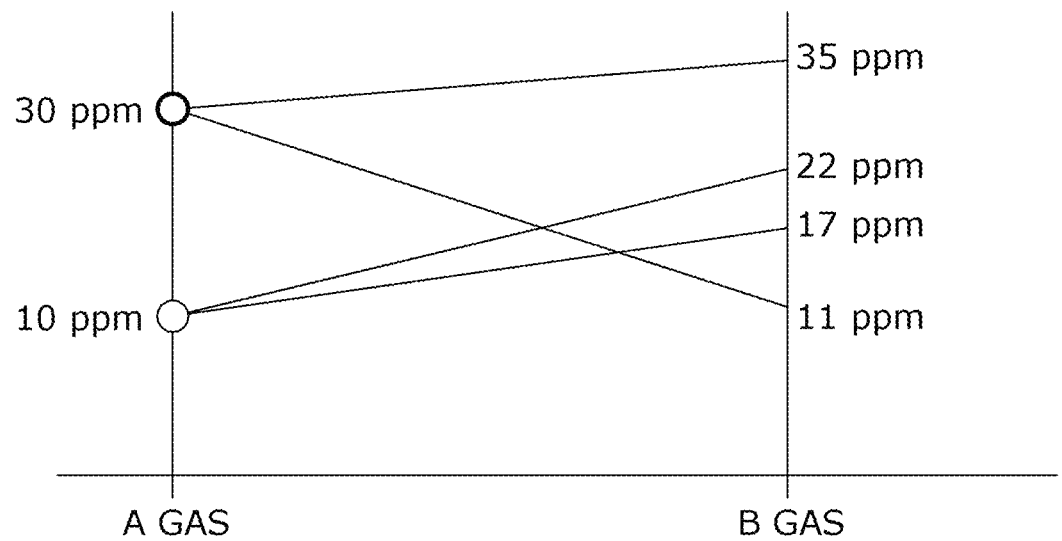
FIG. 11 is a diagram illustrating effects of giving weights to different kinds of input data according to an exemplary embodiment of the present invention.

As shown in FIG. 11, it is possible to obtain the same effect by sequentially performing operation of different pieces of data (an A gas concentration and a B gas concentration) input at the same point in time in the same way.

Third Embodiment of Operation Method

Figure 12:
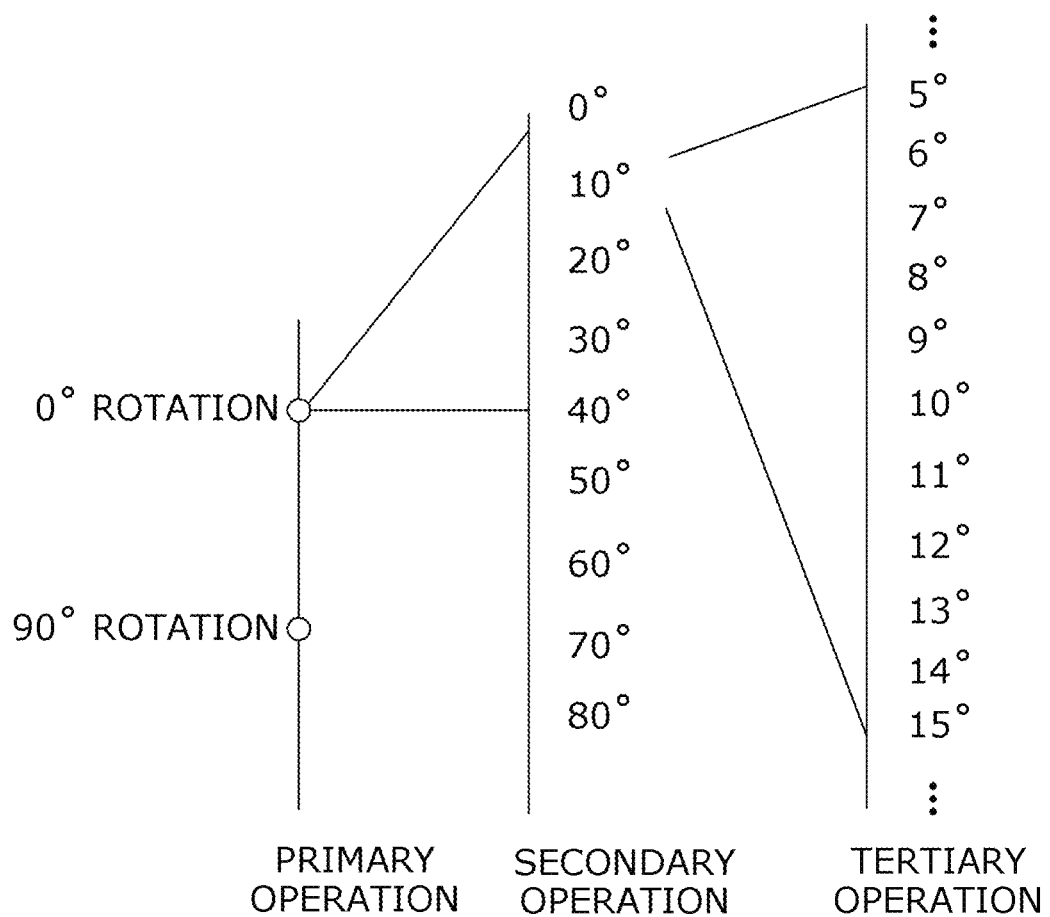
FIG. 12 is a diagram illustrating an operation method of increasing precision in stages according to an exemplary embodiment of the present invention.

FIG. 12 shows a method of increasing precision in operation stages.

In determining a part's tilt of 0 degrees to 90 degrees on the basis of images, it is necessary to provide at least 90 pieces of training data (reference values) on each tilted image data and prepare an image of the part and 90 reference values in order to determine the tilt in units of 1 degree in an existing single-layer structure.

However, when the determination is made in three stages, it is possible to obtain the same precision with comparison operations based on a much smaller number of reference values.

In other words, in the first stage, image data is compared with only two pieces of training data (reference values) in which tilt angles are 0 degrees and 90 degrees. When it is determined that the tilt angle of the image data is closer to 0 degrees than to 90 degrees, in the second stage, five reference values (0, 10, 20, 30, 40) are provided in units of 10 degrees are compared with the image data. When it is determined that the tilt angle is close to 10 degrees among the five reference values, in the third stage, 11 reference values in units of 1 degree, that is, reference values ranging from 5 degrees to 15 degrees, are compared with the image data. Among the reference values, one reference value most similar to the image data is detected and determined as the tilt angle so that the tilt may be determined with precision of 1 degree. In this case, only a total of 18 reference values are required for comparison in the three stages.

In recognizing a tilt with a precision of 0.1 degrees, it is necessary to perform comparison operations between 900 pieces of reference values and image data in a single-layer structure. However, when multiple, that is, four, layers are used for 4-stage operations, it is possible to accurately recognize the tilt with only 30 or less reference values.

Since there is a range which is too large or too many data values to be compared, training data to be used as reference values may be vast, and all the training data may not be stored in a neuromorphic memory only. In this case, it is necessary to store the reference values in an external memory and transfer necessary reference values to the neuromorphic memory for comparison operations with input data. When the amount of training data to be compared with the input data is reduced, it is possible to remarkably reduce the processing load and power consumption caused by changes in reference values.

In the above-described embodiments, the size of input data and the input point in time are estimated by the PSE 220, and memory regions for input data sets and reference data sets are allocated and each data set is stored by the PSM 210. The operation sequence and point in time for each input data set may be controlled by the PSM 210 or an operation controller (not shown).

An estimation-based memory management method according to an exemplary embodiment of the present invention is executed in a core system in a neuromorphic semiconductor without accessing an external memory. Therefore, the processing rate is high, and power consumption is reduced accordingly.

According to an exemplary embodiment of the present invention, it is possible to simultaneously use a multi-layer scheme and a weighting method which allows recursive operation through a neuromorphic memory. Therefore, it is possible to depart from a simple algorithm application method which is based on a single layer due to characteristics of an existing neuromorphic semiconductor and to apply various deep learning algorithms and an optimal machine learning algorithm (e.g., support vector machine (SVM)).

Also, it is possible to use an unused region by allocating a part of a neuromorphic memory which is not used by input data and learn various pieces of data at once with one input without a reset process. Since various pieces of data are learned at once, it is possible to define one recognition rule based on fused information. Also, since it is necessary to store the recognition rule only once, it is possible to reduce the number of times that data is stored in an external memory unit through a system bus.

Embodiments of the present invention have been described in detail above with reference to the accompanying drawings, but the embodiments are merely exemplary. Those of ordinary skill in the technical field to which the present invention pertains should understand that the present invention can be easily modified in other specific forms without changing the technical spirit or essential features of the present invention. Therefore, it should be understood that the above-described embodiments are only illustrative in all aspects and not restrictive.

For example, each component described as a single type may be implemented in a distributed manner. Likewise, components described as a distributed type may be implemented in a combined type. As an example, in each embodiment, a PSM and a PSE have been described as separate software modules or hardware modules, but a PSM and a PSE may be implemented and operate as one combined piece of software or hardware.

Although the system and method of the present invention have been described in association with specific embodiments, some or all of components or operations thereof may be implemented using a computer system having a universal hardware architecture.

In particular, a memory in a neuromorphic semiconductor has been mainly described in the above embodiments. However, a structure of the technical spirit of the present invention which may be applied to a different type of memory may be applied to a different type of memory management.

Therefore, the scope of the present invention is defined by the following claims, and it should be interpreted that all the changes or modified forms derived from the equivalent concepts thereto fall within the scope of the present invention.

What is claimed is:

1. A system for managing a memory, the system comprising:
   a memory having a multi-dimensional lattice structure;
   a prescience estimator (PSE) configured to separately estimate memory use of two or more data sets and determine a sequence of inputting the two or more data sets to the memory; and
   a prescience manager (PSM) configured to allocate memory regions in which the two or more data sets will be stored according to estimation results of the PSE, store the data sets, and perform learning and inference.

2. The system of claim 1, wherein the memory has one of a two dimensional (2D) lattice structure and a three dimensional (3D) lattice structure and can be accessed in two or more directions according to the lattice structure.

3. The system of claim 1, wherein the PSE estimates a type and a size of data input in a certain period of time on the basis of at least one of pre-stored reference information and output data information of an executed application.

4. The system of claim 1, wherein the PSE determines a memory allocation sequence of the two or more data sets in order of estimated data set size.

5. The system of claim 1, wherein the PSE reallocates memory regions to the two or more data sets on the basis of estimated data set sizes and the number of cells in any one side of a memory region temporarily set for each data set.

6. The system of claim 1, wherein the memory comprises:
a storage configured to store the two or more data sets and reference data to be used for operation; and
an operation section configured to perform operation of the data sets on the basis of the reference data.

7. The system of claim 1, wherein the PSM learns the two or more data sets stored in the memory and controls the memory to store results of the learning.

8. The system of claim 1, wherein the PSM alternately stores the two or more data sets in two or more axial directions of the memory.

9. The system of claim 1, wherein the PSM allocates two or more memory regions in which the two or more data sets will be stored and detects and manages in which one of the memory regions each data set is stored.

10. A method of managing a neuromorphic semiconductor memory, the method comprising:
allocating different memory regions of the neuromorphic semiconductor memory having a multi-dimensional lattice structure to two or more input data sets and storing the two or more input data sets in the different memory regions according to estimated sizes of the two or more input data sets;
learning the two or more input data sets;
storing results of the learning in a new memory region as pieces of reference data; and
comparing one or more new input data sets with the reference data.

11. The method of claim 10, wherein the storing of the memory regions comprises:
estimating a size of each of the two or more input data sets; and
allocating a memory region to an input data set having a large size according to results of the estimation first among the input data sets and storing the input data set in the memory region.

12. The method of claim 10, further comprising determining reference data to be used for operation of a new subsequent input data set among the stored pieces of reference data according to results of the comparison.

13. The method of claim 10, wherein the allocating of the memory regions to the two or more input data sets and the storing of the two or more input data sets in the memory regions comprise:
estimating a size of each of the two or more data sets;
detecting a currently available memory region;
allocating memory regions in which the two or more data sets will be stored;
determining a data set storing sequence on the basis of the sizes of the two or more data sets; and
storing the two or more data sets in the memory regions according to the storing sequence.

14. The method of claim 13, wherein the allocating of the memory regions comprises:
dividing a remaining region into one or more regions according to a lambda element technique; and
allocating the one or more regions to data sets to which memory regions have not been allocated in order of data set size according to a size sequence of the one or more regions.

15. The method of claim 13, wherein the storing of the two or more data sets comprises:
calculating a ratio UT of a size of a corresponding data set to the number H of cells in one certain side of each of the allocated memory regions; and
determining a storing sequence of the data sets in decreasing order of the ratio.

16. The method of claim 15, wherein the calculating of the ratio UT comprises calculating the ratio UT according to the following equation:

$$UT=B/H$$

(where B is the size of the data set equal to a size of memory which will be allocated to the data set).

17. The method of claim 15, further comprising:
reallocating a memory region to each of the data sets so that a ratio of H of a memory region to UT of a corresponding data set is in the range of one to five; and
storing each of the data sets to the reallocated memory region.

18. The method of claim 10, wherein the neuromorphic semiconductor memory has a two-dimensional lattice structure that allows for a memory access from four directions including up, down, left, and right directions.

19. The method of claim 10, wherein the neuromorphic semiconductor memory has a three-dimensional lattice structure that allows for a memory access from six directions including both directions of x, y, and z axes.

20. A system for managing a neuromorphic memory, the system comprising:
a neuromorphic memory having a multi-dimensional lattice structure;
a prescience estimator (PSE) configured to estimate memory use of each of two or more data sets and determine a sequence of inputting the two or more data sets to the memory; and
a prescience manager (PSM) configured to store learned reference data for the two or more data sets in the memory according to results of the estimation of the PSE and compare the reference data with the two or more data sets.

21. The system of claim 20, wherein the neuromorphic memory comprises:
a memory cell configured to store the two or more data sets and reference data to be used for operation; and
an operation section configured to perform operation of the data sets on the basis of the reference data.

22. The system of claim 20, wherein the PSM determines reference data for at least one of the two or more data sets according to a comparison result of any one of other data sets.

* * * * *